US012798616B2

(12) United States Patent
Hori et al.

(10) Patent No.: US 12,798,616 B2
(45) Date of Patent: Nov. 17, 2026

(54) RANGE SETTING APPARATUS

(71) Applicant: ISUZU MOTORS LIMITED, Tokyo (JP)

(72) Inventors: Kenji Hori, Fujisawa (JP); Yuji Houzumi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 214 days.

(21) Appl. No.: 18/727,233

(22) PCT Filed: Dec. 13, 2022

(86) PCT No.: PCT/JP2022/045819
§ 371 (c)(1),
(2) Date: Jan. 6, 2025

(87) PCT Pub. No.: WO2023/136022
PCT Pub. Date: Jul. 20, 2023

(65) Prior Publication Data

US 2025/0121853 A1 Apr. 17, 2025

(30) Foreign Application Priority Data

Jan. 17, 2022 (JP) ................................. 2022-005106

(51) Int. Cl.
*B60W 60/00* (2020.01)
*B60W 30/14* (2006.01)
*B60W 50/02* (2012.01)

(52) U.S. Cl.
CPC ...... *B60W 60/0015* (2020.02); *B60W 30/143* (2013.01); *B60W 50/0205* (2013.01); *B60W 2555/20* (2020.02)

(58) Field of Classification Search
CPC .... B60W 10/20; B60W 30/09; G05D 1/0246; B60L 7/10; G08G 1/167; B65G 67/04; G06F 16/29
See application file for complete search history.

(56) References Cited

U.S. PATENT DOCUMENTS 6,694,233 B1 * 2/2004 Duff ..................... G05D 1/0246 73/178 R
2010/0059017 A1 3/2010 Kasbauer
(Continued)

FOREIGN PATENT DOCUMENTS

CN 103247185 A * 8/2013 ............. G08G 1/167
CN 110867076 A * 6/2020 ............. G06F 16/29
(Continued)

OTHER PUBLICATIONS

International Search Report from International Application No. PCT/JP2022/045819 mailed Feb. 28, 2023.

*Primary Examiner* — Yuri Kan
(74) *Attorney, Agent, or Firm* — Shih IP Law Group, PLLC

(57) ABSTRACT

A range setting apparatus comprises: an information acquisition part that acquires equipment status information indicating the state of equipment mounted on the autonomous driving vehicle and vehicle status information indicating the state of the autonomous driving vehicle and/or environmental status information indicating the state of surrounding environment; a determination part that determines a first safety parameter indicating a safety degree based on the vehicle status information and the equipment status information, and/or a second safety parameter indicating a safety degree based on the environmental status information and the equipment status information; and a range setting part that, when the specified parameter is less than a determinant threshold the setting range in which a target value of the
(Continued)

autonomous driving vehicle can be set in accordance with said the determined parameter.

11 Claims, 5 Drawing Sheets

(56) References Cited

U.S. PATENT DOCUMENTS

| | | | | |
|---|---|---|---|---|
| 2017/0291560 | A1 | 10/2017 | Schroeder | |
| 2018/0348769 | A1 | 12/2018 | Sato | |
| 2020/0064839 | A1 | 2/2020 | Oyama | |
| 2022/0169119 | A1* | 6/2022 | Liu | B60L 7/10 |

FOREIGN PATENT DOCUMENTS

| | | | | | |
|---|---|---|---|---|---|
| CN | 111240328 | A | | 6/2020 | |
| CN | 111348446 | A | * | 6/2020 | B65G 67/04 |
| CN | 113619576 | A | * | 11/2021 | B60W 30/09 |
| JP | 2018-500220 | A | | 1/2018 | |
| JP | 2018-203032 | A | | 12/2018 | |
| JP | 2019-174168 | A | | 10/2019 | |
| JP | 2020-029238 | A | | 2/2020 | |

* cited by examiner

| | RESTRICTION RANGE | |
|---|---|---|
| PARAMETER RANGE | SPEED RESTRICTION RANGE | STEERING ANGLE RESTRICTION RANGE |
| 0.6 TO LESS THAN 0.8 | MAXIMUM SPEED 30km/h | NO LIMIT |
| 0.4 TO LESS THAN 0.6 | MAXIMUM SPEED 20km/h | MAXIMUM STEERING ANGLE 20° |
| 0.2 TO LESS THAN 0.4 | MAXIMUM SPEED 10km/h | MAXIMUM STEERING ANGLE 10° |

FIG. 2

RANGE SETTING APPARATUS

The present application is a U.S. National Stage entry of PCT Application number PCT/JP2022/045819, filed on Dec. 13, 2022, which claims priority under 35 U.S.C § 119(a) to Japanese Patent Application No. 2022-5106, filed on Jan. 17, 2022, contents of which are incorporated herein by reference in their entirety.

TECHNICAL FIELD

The present disclosure relates to a range setting apparatus for setting a control target value of an autonomous driving vehicle.

BACKGROUND OF THE INVENTION

There is known a technique of stopping an autonomous driving vehicle when an abnormality occurs in the autonomous driving vehicle. Patent Document 1 discloses a technique for stopping an autonomous driving vehicle in case of an abnormality in a sensor mounted on the autonomous driving vehicle.

PRIOR ART

Patent Document

Patent Document 1: Japanese Unexamined Patent Application Publication No. 2019-174168

BRIEF DESCRIPTION OF THE INVENTION

Problem to be Solved by the Invention

The technique disclosed in Patent Document 1 stops an autonomous driving vehicle regardless of a degree of abnormality, which can sometimes obstruct the driving of other vehicles. For example, if an autonomous driving vehicle experiencing a minor abnormality that does not necessitate a halt is stopped on a narrow road, the stopped autonomous driving vehicle becomes an obstacle to other moving vehicles.

The present disclosure focuses on this point, and an object thereof is to avoid obstructing the driving of other vehicles.

Means for Solving the Problem

An aspect of the present disclosure provides a range setting apparatus mounted on an autonomous driving vehicle, including an information acquisition part that acquires i) at least any of vehicle condition information indicating a condition of the autonomous driving vehicle and environmental condition information indicating condition of a surrounding environment of the autonomous driving vehicle, and ii) device condition information indicating condition of a device mounted on the autonomous driving vehicle, a determination part that determines at least any parameter among i) a first safety parameter indicating a degree of safety of the autonomous driving vehicle while driving based on the vehicle condition information and the device condition information and ii) a second safety parameter indicating the degree of safety based on the environmental condition information and the device condition information, and a range setting part that narrows the setting range according to the parameter, if the parameter determined by the determination part is below a determination threshold value for determining whether to restrict a setting range in which at least one of the speed control and the steering angle control of the autonomous driving vehicle can be set.

The range setting part may narrow the setting range according to a parameter range, including a value of the parameter determined by the determination part, among a plurality of parameter ranges obtained by dividing a range of possible values for the parameter into a plurality of segments.

The determination part may determine the first safety parameter and the second safety parameter, and the range setting part may set a new setting range to be whichever range is narrower among i) a range narrowed from the setting range in accordance with the first safety parameter and ii) a range narrowed from the setting range in accordance with the second safety parameter.

The determination part may determine the first safety parameter and the second safety parameter, and the range setting part may narrow the setting range according to a lower one of the first safety parameter and the second safety parameter.

The information acquisition part may acquire i) the device condition information including detection accuracy degradation information indicating a degree of degradation of detection accuracy of the device that detects a surrounding environment of the autonomous driving vehicle and ii) the vehicle condition information including malfunction state information indicating a malfunction that has occurred in the autonomous driving vehicle, and the determination part may determine the first safety parameter on the basis of i) the degree of degradation of detection accuracy indicated by the detection accuracy degradation information and ii) a degree of threat due to the malfunction indicated by the malfunction state information.

The determination part may determine, as a degree of threat due to the malfunction, a value obtained by multiplying i) a value indicating occurrence of the malfunction indicated by the vehicle condition information by ii) a value indicating magnitude of an impact of the malfunction on safety while driving.

The determination part may determine, as the first safety parameter, a value obtained by subtracting a higher one of the degree of threat and the degree of detection accuracy degradation, from a maximum value of the degree of safety.

The determination part may determine, as the first safety parameter, whichever value is lower among i) a value obtained by subtracting the degree of threat from a maximum value of the degree of safety and ii) a value obtained by subtracting the degree of degradation of detection accuracy from the maximum value.

The determination part may determine, as the second safety parameter, a sum of values obtained by multiplying each of a plurality of the degrees of safety by a weight of each of the degrees of safety.

The information acquisition part may acquire the environmental condition information including i) ground condition information indicating a condition of ground on which the autonomous driving vehicle is driving and ii) weather condition information indicating a condition of weather around the autonomous driving vehicle, detected by the device that detects a surrounding environment of the autonomous driving vehicle, and the device condition information including i) communication quality information indicating communication quality of a communication device mounted on the autonomous driving vehicle and ii) position detection accuracy information indicating position detection accuracy of a position detection device that detects a position of the autonomous driving vehicle, wherein the determination part may determine, as the second safety parameter, a sum of i) a ground safety degree indicating a degree of safety according to the ground condition indicated by the ground condition information, ii) a weather safety degree indicating a degree of safety according to the weather condition indicated by the weather condition information, iii) a communication safety degree indicating a degree of safety according to the communication quality indicated by the communication quality information, and iv) a position safety degree indicating a degree of safety according to the position detection accuracy indicated by the position detection accuracy information.

Effect of the Invention

According to the present disclosure, it is possible to avoid obstructing the driving of other vehicles.

BRIEF DESCRIPTION OF THE DRAWINGS

FIG. 2 illustrates a restriction range associated with each parameter range.

DESCRIPTION OF EMBODIMENTS

[Configuration of Autonomous Driving Vehicle M]

Figure 1:
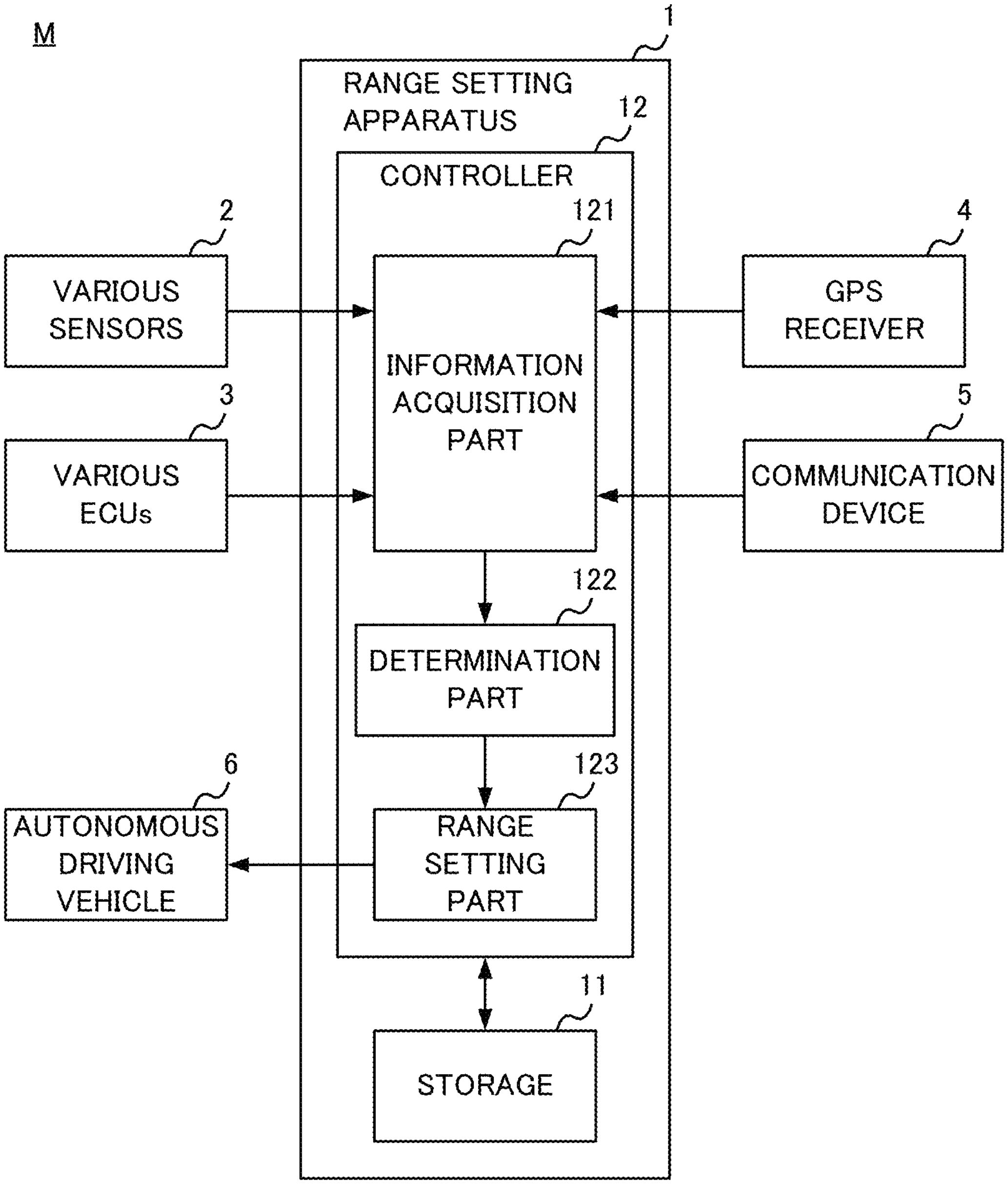
FIG. 1 illustrates a configuration of an autonomous driving vehicle.

FIG. 1 illustrates a configuration of an autonomous driving vehicle M. The autonomous driving vehicle M is a vehicle that performs autonomous driving. The autonomous driving vehicle M has, mounted thereon, a range setting apparatus 1, various sensors 2, various ECUs 3, a GPS receiver 4, a communication device 5, and an autonomous driving device 6.

The various sensors 2 are a plurality of devices that detect conditions of the surrounding environment of the autonomous driving vehicle M. The various sensors 2 include, but are not limited to, a camera, a radar, a Laser Imaging Detection and Ranging (LiDAR), and a rain/snow sensor, for example. The camera captures an image of the surroundings of the autonomous driving vehicle M and generates a captured image. The radar and the LiDAR detect an object around the autonomous driving vehicle M and a state of the object. The rain/snow sensor detects whether the weather condition is clear, rainy, or snowy by determining the presence of moisture.

The various sensors 2 detect a ground condition about the ground on which the autonomous driving vehicle M is driving on the basis of, for example, the captured image and a detection result of the LiDAR. The ground condition includes, but is not limited to, "dry," "wet," and "snow-covered," for example. Further, the various sensors 2 detect the weather condition on the basis of, for example, the captured image and the detection results of the LiDAR and the rain/snow sensor. The weather condition includes, but is not limited to, "clear," "rainy," and "snowy," for example. The various sensors 2 output environmental condition information indicating the detected condition of the surrounding environment, to the range setting apparatus 1. Specifically, the various sensors 2 output the environmental condition information including at least one of i) ground condition information indicating the ground condition and ii) weather condition information indicating the weather condition.

The various sensors 2 have a self-diagnostic function of determining a degree of degradation of detection accuracy for each device. The degree of degradation of detection accuracy is represented by a number between 0 and 1, for example, and the higher the number, the lower the accuracy. The various sensors 2 determine the degree of degradation of detection accuracy on the basis of a degree of contamination of a lens surface of the LiDAR and a degree of inclination of a sensor axis, for example. Then, the various sensors 2 output device condition information including detection accuracy degradation information indicating the degree of degradation of detection accuracy, to the range setting apparatus 1.

The various Electronic Control Units (ECUs) 3 control a plurality of devices mounted on the autonomous driving vehicle M. The various ECUs 3 output vehicle condition information indicating the condition of the autonomous driving vehicle M, to the range setting apparatus 1. Specifically, the various ECUs 3 output the vehicle condition information including malfunction state information (Diagnostic Trouble Code) indicating malfunctions occurring in each device of the autonomous driving vehicle M. The malfunction state information is a code defined according to details of possible malfunction in each device of the autonomous driving vehicle M. Specifically, the malfunction state information is represented by a combination of alphanumeric characters. As a specific example, malfunction state information [P0121] indicates a failure of a throttle position sensor circuit, and malfunction state information [P0122] indicates a voltage drop of a throttle position sensor circuit.

The various ECUs 3 determine whether the malfunction indicated by the malfunction state information has occurred at predetermined time intervals (for example, 100 milliseconds). If a malfunction indicated by the malfunction state information has occurred a predetermined number of times (for example, 10 times), the various ECUs 3 output information indicating that the malfunction indicated by the malfunction state information has occurred, to the range setting apparatus 1. As a specific example, the various ECUs 3 associate the malfunction state information [P0121] with information [1], indicating that the malfunction indicated by the malfunction state information [P0121] (failure of throttle position sensor circuit) has occurred, for output.

If the malfunction indicated by the malfunction state information has not occurred, the various ECUs 3 output information (a numerical value) indicating that this malfunction has not occurred. For example, the various ECUs 3 associate the malfunction state information [PO121] with information [0], indicating that the malfunction indicated by the malfunction state information [PO121] (failure of throttle position sensor circuit) has not occurred, for output.

The Global Positioning System (GPS) receiver 4 is a position detection device for detecting a position of the autonomous driving vehicle M. The GPS receiver 4 receives radio waves transmitted from a GPS satellite and determines coordinates indicating the position of the autonomous driving vehicle M. The GPS receiver 4 has a self-diagnostic function and determines the position detection accuracy. Specifically, the GPS receiver 4 determines the position detection accuracy on the basis of received radio wave intensity and an s/n ratio of the radio waves transmitted from the GPS satellite. The GPS receiver 4 outputs the device condition information including position detection accuracy information indicating the position detection accuracy, to the range setting apparatus 1. It should be noted that the position detection device is not limited to GPS, and other satellite positioning systems (for example, a quasi-zenith satellite system) may be used to determine the coordinates indicating the position.

The communication device 5 is a wireless communication module for transmitting and receiving information to and from another device via a wireless communication line. The wireless communication line is a communication network for a mobile phone, for example, but is not limited thereto. The communication device 5 determines communication quality of communication between the communication device 5 and another device. For example, the communication device 5 determines radio wave intensity, throughput, and response delay as the communication quality. The communication device 5 outputs the device condition information including communication quality information indicating the communication quality, to the range setting apparatus 1.

The autonomous driving device 6 automatically drives the autonomous driving vehicle M by controlling speed and a steering angle of the autonomous driving vehicle M on the basis of the condition of the surrounding environment detected by the various sensors 2. The autonomous driving device 6 sets a target value of speed control (hereinafter, referred to as a "target speed") on the basis of the condition of the surrounding environment or the like, and controls output of a power unit mounted on the autonomous driving vehicle M (for example, an engine) so that the speed of the autonomous driving vehicle M becomes the target speed. Further, the autonomous driving device 6 sets a target value of steering angle control (hereinafter, referred to as a "target steering angle"), and turns a steering wheel of the autonomous driving vehicle M, for example, so that the steering angle of the autonomous driving vehicle M becomes the target steering angle.

The autonomous driving device 6 may stop the autonomous driving vehicle M according to a malfunction of the device mounted on the autonomous driving vehicle M, an abnormality of the various sensors 2, degradation of the communication quality of the communication device 5, degradation of the position detection accuracy of the GPS receiver 4, and the condition of the surrounding environment such as the weather and the ground condition. For example, the autonomous driving device 6 stops the autonomous driving vehicle M if the various sensors 2 are unable to detect an object around the autonomous driving vehicle M and the state of the object. However, if the autonomous driving vehicle M is stopped on a narrow road when the various sensors 2 experience a minor abnormality (for example, degradation of detection accuracy within an acceptable limit) that does not necessitate a halt, the stopped autonomous driving vehicle M becomes an obstacle to other moving vehicles.

Therefore, the range setting apparatus 1 restricts a setting range in which at least one of the target value of the speed control and the target value of the steering angle control can be set, according to a malfunction state of the device mounted on the autonomous driving vehicle M, the condition of the surrounding environment of the autonomous driving vehicle M, and condition of the device mounted on the autonomous driving vehicle M. The autonomous driving device 6 then drives the autonomous driving vehicle M so as to achieve the target speed and the target steering angle within a range restricted by the range setting apparatus 1. As a result, the autonomous driving device 6 can drive the autonomous driving vehicle M at a speed and a steering angle within a range that does not compromise the safety, without stopping the autonomous driving vehicle M. Therefore, the autonomous driving device 6 can prevent the autonomous driving vehicle M from stopping in a situation where a halt is not necessary, thus preventing the autonomous driving vehicle M from becoming an obstacle to other moving vehicles.

A configuration of the range setting apparatus 1 will be described below.

[Configuration of Range Setting Apparatus 1]

The range setting apparatus 1 includes a storage 11 and a controller 12. The storage 11 is a storage medium including a Read Only Memory (ROM), a Random Access Memory (RAM), a hard disk, and the like. The storage 11 stores a program executed by the controller 12.

The controller 12 is a calculation resource including a processor such as a Central Processing Unit (CPU). The controller 12 achieves functions of an information acquisition part 121, a determination part 122, and a range setting part 123 by executing the program stored in the storage 11.

The information acquisition part 121 acquires i) at least one of the vehicle condition information and the environmental condition information, and ii) the device condition information. Specifically, the information acquisition part 121 acquires the vehicle condition information including the malfunction state information from the various ECUs 3, and acquires the device condition information including the detection accuracy degradation information from the various sensors 2. Further, the information acquisition part 121 acquires i) the environmental condition information including the ground condition information and the weather condition information from the various sensors 2, ii) the device condition information including the position detection accuracy information from the GPS receiver 4, and iii) the device condition information including the communication quality information from the communication device 5.

The determination part 122 determines a parameter indicating a degree of safety of the autonomous driving vehicle M while driving (hereinafter, referred to as a "safety parameter") on the basis of various pieces of information acquired by the information acquisition part 121. For example, the determination part 122 determines the safety parameter at predetermined time intervals. The predetermined time interval is a processing cycle of the controller 12, for example, and a specific value is 100 milliseconds.

The determination part 122 determines a first safety parameter which is based on i) a degree of threat due to the malfunction indicated by the malfunction state information included in the vehicle condition information and ii) the degree of degradation of detection accuracy indicated by the detection accuracy degradation information included in the device condition information. The determination part 122 determines the degree of threat due to the malfunction. Specifically, the determination part 122 determines, as the degree of threat due to the malfunction, a value obtained by multiplying i) information indicating an occurrence of the malfunction indicated by the malfunction state information by ii) magnitude of an impact of that malfunction on the safety while driving. The magnitude of the impact of one malfunction on the safety while driving is determined in advance according to that one malfunction. In the event of simultaneous malfunctions, the determination part 122 determines, as the degree of threat, a sum of values obtained by multiplying i) information indicating the occurrence of each malfunction by ii) the magnitude of the impact of each malfunction on safety while driving. More specifically, the determination part 122 determines a degree of threat t using the following Equation (1).

$$t = (P0121) * (\text{weight of } P0121) + (P0122) \times (\text{weight of } P0122) + \ldots \quad (1)$$

(P0121) is information (a numerical value) indicating whether or not the malfunction indicated by the malfunction state information [P0121] (failure of throttle position sensor circuit) has occurred. (P0121) is entered as [1] if the malfunction indicated by [P0121] has occurred, and is entered as [0] if the malfunction indicated by [P0121] has not occurred. (weight of P0121) is a value indicating the magnitude of the impact of the malfunction indicated by the malfunction state information [P0121] on the safety while driving, and is represented by a numerical value between 0 and 1. (P0122) is information (a numerical value) indicating whether or not the malfunction indicated by the malfunction state information [P0122] (voltage drop of throttle position sensor circuit) has occurred. (P0122) is entered as [1] if the malfunction indicated by [P0121] has occurred, and is entered as [0] if the malfunction indicated by [P0121] has not occurred. (weight of P0122) is a value indicating the magnitude of the impact of the malfunction indicated by the malfunction state information [P0122] on the safety while driving, and is represented by a numerical value between 0 and 1. The higher the numerical value of the degree of threat t, the greater the impact of the malfunction on the safety while driving, that is, the greater the threat caused by the malfunction.

The determination part 122 determines, as the first safety parameter, a value obtained by subtracting the greater one of i) the degree of threat t of the malfunction and ii) the degree of degradation of detection accuracy, from the maximum value of the degree of safety (for example, 1). Specifically, the determination part 122 determines a first safety parameter sp1 within a range between 0 and 1 using the following Equation (2).

$$sp1 = 1 - \max(t, d) \quad (2)$$

In Equation (2), d is the degree of degradation of detection accuracy and max (t, d) is a symbol representing the maximum value among the degree of threat t of the malfunction and a degree of degradation of detection accuracy d.

It should be noted that the determination part 122 may determine, as the first safety parameter sp1, the lower of i) a value obtained by subtracting the degree of threat t of the malfunction from the maximum value of the degree of safety and ii) a value obtained by subtracting the degree of degradation of detection accuracy d from the maximum value of the degree of safety. Specifically, the determination part 122 determines the first safety parameter sp1 using the following Equation (3).

$$sp1 = \min(1 - t, 1 - d) \quad (3)$$

In Equation (3), min (1-t, 1-d) is a symbol representing the minimum value among i) a value obtained by subtracting the degree of threat t of the malfunction from the maximum value of the degree of safety (1) and ii) a value obtained by subtracting the degree of degradation of detection accuracy d from the maximum value of the degree of safety (1).

The determination part 122 determines a second safety parameter on the basis of the environmental condition information and the device condition information. For example, the determination part 122 determines the second safety parameter on the basis of i) the degree of safety while driving under the surrounding environment in the condition indicated by the environmental condition information and ii) the degree of safety while driving using the device in the condition indicated by the device condition information.

The determination part 122 first determines a ground safety degree indicating the degree of safety according to the ground condition indicated by the ground condition information included in the environmental condition information. Specifically, the determination part 122 determines, as the ground safety degree, a value obtained by multiplying i) information (a numerical value) indicating that the ground on which the autonomous driving vehicle M is driving is in one condition indicated by the ground condition information by ii) the degree of safety when driving on ground in that condition.

The degree of safety when driving on the ground in one condition is determined in advance according to that one condition, and is represented by a numerical value between 0 and 1. In one example, the degree of safety when driving on ground in a "dry condition" is [1]. More specifically, the determination part 122 determines, as a ground safety degree r, a sum of values obtained by multiplying i) each piece of information (numerical values) indicating the ground condition by ii) a weight corresponding to the degree of safety of each ground condition.

The determination part 122 determines the ground safety degree r using the following Equation (4).

$$r = (\text{dry condition}) * (\text{weight of dry condition}) + (\text{wet condition}) * (\text{weight of wet condition}) \quad (4)$$

The (dry condition) is entered as information (a numerical value) indicating whether or not the ground on which the autonomous driving vehicle M is driving is in the dry condition. The (dry condition) is entered as [1] if the ground is in the dry condition, and is entered as [0] if the ground is not in the dry condition. The (wet condition) is entered as information (a numerical value) indicating whether or not the ground on which the autonomous driving vehicle M is driving is in a wet condition. The (wet condition) is entered as [1] if the ground is in the wet condition, and is entered as [0] if the ground is not in the wet condition. That is, if the ground on which the autonomous driving vehicle M is driving is in the dry condition, the (dry condition) is [1], and the (wet condition) is [0].

Next, the determination part 122 determines a weather safety degree indicating the degree of safety according to the weather condition indicated by the weather condition information. Specifically, the determination part 122 determines, as the weather safety degree, a value obtained by multiplying i) information indicating that the weather around the autonomous driving vehicle M while driving is in a condition indicated by the weather condition information by ii) the degree of safety while driving under the weather in that condition. The degree of safety while driving under the weather in one condition is determined in advance according to that condition, and is represented by a numerical value between 0 and 1. For example, the degree of safety while driving in a "clear condition" is [1]. More specifically, the determination part 122 determines, as a weather safety degree w, a sum of values obtained by multiplying i) each piece of information (numerical values) indicating the weather condition by ii) a weight corresponding to the degree of safety of each weather condition.

The determination part 122 determines the weather safety degree w using the following Equation (5).

$$w = (\text{clear condition}) * (\text{weight of clear condition}) + (\text{rainy condition}) * (\text{weight of rainy condiiton}) \quad (5)$$

The (clear condition) is entered as information (a numerical value) indicating whether or not the weather around the autonomous driving vehicle M while driving is in the clear condition. The (clear condition) is entered as [1] if the weather is in the clear condition, and is entered as [0] if the weather is not in the clear condition. The (rainy condition) is entered as information (a numerical value) indicating whether or not the weather around the autonomous driving vehicle M while driving is in the rainy condition. The (rainy condition) is entered as [1] if the weather is in the rainy condition, and is entered as [0] if the weather is not in the rainy condition. That is, if the weather around the autonomous driving vehicle M is clear, the (clear condition) is [1], and the (rainy condition) is [0].

Subsequently, the determination part 122 determines a communication safety degree indicating the degree of safety according to the communication quality indicated by the communication quality information. Specifically, the determination part 122 determines, as the communication safety degree, a value obtained by multiplying i) information indicating that the communication quality between the communication device 5 and another device is in a state indicated by the communication quality state information by ii) the degree of safety when the autonomous driving vehicle M drives while communicating with that communication quality. More specifically, the determination part 122 determines, as a communication safety degree C., a sum of values obtained by multiplying i) each piece of information (numerical values) indicating the communication quality state by ii) a weight of the degree of safety of each communication quality.

The determination part 122 determines the communication safety degree C. using the following Equation (6).

$$c = (\text{radio wave intensity}) * (\text{weight of radio wave intensity}) + (\text{throughput}) * (\text{weight of throughput}) + (\text{response delay}) * (\text{weight of response delay}) \quad (6)$$

The (radio wave intensity) is entered as information (a numerical value) indicating the radio wave intensity of wireless communication of the communication device 5. The determination part 122 enters a higher value for the (weight of radio wave intensity) as the value of the (radio wave intensity) increases. The (throughput) is entered as information (a numerical value) indicating whether or not the throughput is equal to or less than a predetermined value causing the communication quality to be degraded. The (throughput) is entered as [1] if an amount that can be processed per unit time decreases such that the throughput is the predetermined value or less, and is entered as [0] if the amount that can be processed per unit time is larger than the predetermined value. The (response delay) is entered as information (a numerical value) indicating whether or not a delay time is equal to or greater than a predetermined value such that the communication quality is degraded. The (response delay) is entered as [1] if a time taken for receiving a response to a request is the predetermined value or more, and is entered as [0] if the time taken for receiving a response to a request is less than the predetermined value.

The (weight of radio wave intensity) is represented by a value higher than 0 and lower than or equal to 1. On the other hand, the (weight of throughput) and the (weight of response delay) are represented by values from minus 1 to less than 0. In this way, the determination part 122 can determine a higher communication safety degree C. as the radio wave intensity increases. In addition, when the communication quality is degraded due to the degradation of throughput or the response delay, the determination part 122 can determine a communication safety degree C. that is lower than that when the communication quality is not degraded. It should be noted that if the communication safety degree C. is determined to be less than 0 due to the degradation of throughput or the response delay, the determination part 122 sets the communication safety degree C. to 0 and determines the communication safety degree as a value between 0 and 1.

Further, the determination part 122 determines a position safety degree indicating the degree of safety according to the position detection accuracy indicated by the position detection accuracy information. Specifically, the determination part 122 determines a position safety degree sc that becomes higher as the position detection accuracy is higher. The determination part 122 determines the position safety degree sc within a range between 0 and 1. It should be noted that the order in which the determination part 122 determines the ground safety degree r, the weather safety degree w, the communication safety degree C., and the position safety degree sc is not limited to the above, and may be determined from any safety degree, or these safety degrees may be determined in parallel.

The determination part 122 determines, as the second safety parameter, a sum of the ground safety degree r, the weather safety degree w, the communication safety degree C., and the position safety degree sc. Specifically, the determination part 122 determines, as the second safety parameter, a sum of values obtained by multiplying i) each of the degrees of safety by ii) a weight of each of the degrees of safety. More specifically, the determination part 122 determines the second safety parameter sp2 using the following Equation (7).

$$sp2 = (r) * (\text{weight of } r) + (w) * (\text{weight of } w) + (c) * (\text{weight of } c) + (sc) * (\text{weight of } sc) \quad (7)$$

The determination part 122 determines the second safety parameter sp2 to be between 0 and 1. For example, the determination part 122 sets the weight of each degree of safety so that a sum of values obtained by multiplying i) the maximum value of each of the degrees of safety by ii) the weight of each of the degrees of safety becomes 1. The weight of each of the degrees of safety is appropriately set by experiment or the like.

The determination part 122 may determine at least any one of the first safety parameter sp1 and the second safety parameter sp2, or may determine both the first safety parameter sp1 and the second safety parameter sp2. In the following description, the first safety parameter sp1 and the second safety parameter sp2 are referred to as the "safety parameters" if there is no need to distinguish them from each other.

The range setting part 123 sets a setting range of at least one of the target speed (kilometers per hour) and the target steering angle of the autonomous driving vehicle M every time the safety parameter is determined. For example, if the safety parameter is less than a determination threshold value, the range setting part 123 narrows the setting range according to the safety parameter. The determination threshold value is a threshold value for determining whether or not to restrict the setting range. A specific value of the determination threshold value is 0.8, for example. If at least one of the determined first safety parameter sp1 and second safety parameter sp2 is less than the determination threshold value, the range setting part 123 narrows the setting range according to the safety parameter that is less than the determination threshold value.

The range setting part 123 may narrow the setting range according to a parameter range, including a value of the determined safety parameter, among a plurality of parameter ranges obtained by dividing a range of possible values for the safety parameter into a plurality of segments. In this case, each of the plurality of parameter ranges may be associated with a restriction range for narrowing the setting range. FIG. 2 illustrates the restriction range associated with each parameter range. Each parameter range is associated with i) a speed restriction range (restriction range of speed per hour) for limiting the target speed of the autonomous driving vehicle M and ii) a steering angle restriction range for limiting the target steering angle. Specifically, a parameter range [0.4 to less than 0.6] is associated with a speed restriction range [maximum speed 20 km/h] and a steering angle restriction range [maximum steering angle 20 degrees].

The range setting part 123 sets the restriction range, associated with the parameter range including the safety parameter that is less than the determination threshold value, as the setting range. As a specific example, if the first safety parameter sp1 is [0.7], the range setting part 123 sets the restriction range [maximum speed 30 km/h] associated with the parameter range [0.6 to less than 0.8] the setting range (see FIG. 2).

The range setting part 123 sets a new setting range to be whichever range is narrower among i) a range narrowed from the setting range in accordance with the first safety parameter sp1 and ii) a range narrowed from the setting range in accordance with the second safety parameter sp2. Specifically, the range setting part 123 first determines a first restriction range associated with a parameter range including the first safety parameter sp1. The range setting part 123 subsequently determines a second restriction range associated with a parameter range including the second safety parameter sp2. It should be noted that the range setting part 123 may determine the second restriction range before determining the first restriction range, or may determine the first restriction range and the second restriction range in parallel.

The range setting part 123 then determines whether or not the first restriction range is equal to or less than the second restriction range. If the first restriction range is equal to or less than the second restriction range, the range setting part 123 sets the first restriction range as the setting range. If the second restriction range is less than the first restriction range, the range setting part 123 sets the second restriction range as the setting range. As a specific example, the range setting part 123 sets the second restriction range as the setting range if the first restriction range is a restriction range of a maximum speed of 30 km/h and the second restriction range is a restriction range of a maximum speed of 20 km/h and a maximum steering angle of 20 degrees.

Further, the range setting part 123 may narrow the range according to whichever value is lower among the first safety parameter sp1 and the second safety parameter sp2. Specifically, the range setting part 123 sets the restriction range associated with the parameter range including whichever safety parameter has a smaller value among the first safety parameter sp1 and the second safety parameter sp2, as the setting range. In one example, if the first safety parameter is [0.7] and the second safety parameter is [0.5], the range setting part 123 sets the restriction range associated with the parameter range including [0.5] as the setting range.

Figure 3:
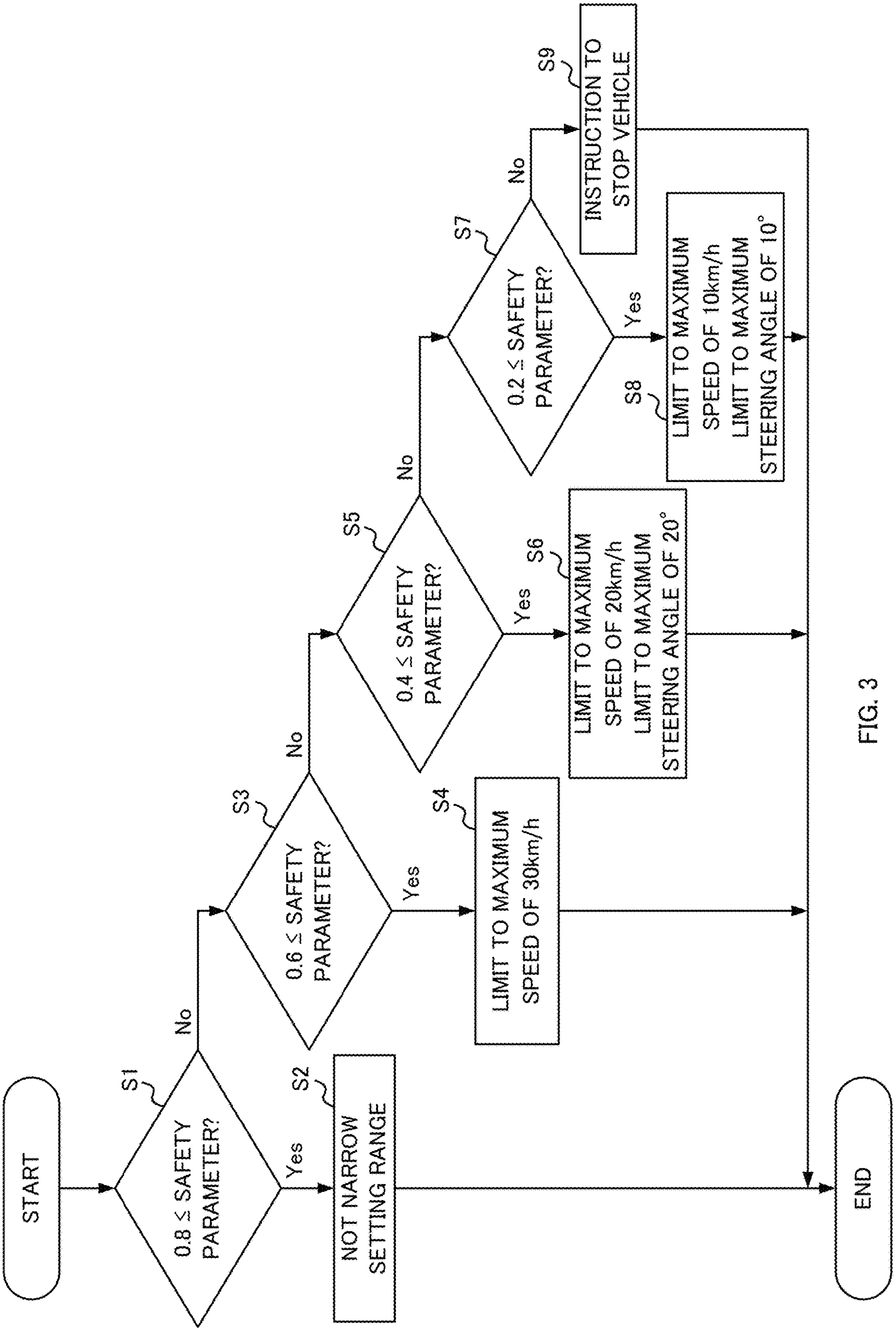
FIG. 3 is a flowchart illustrating an example of a process of narrowing a setting range according to a safety parameter.

Flowchart Showing Example of Process for Narrowing Setting Range According to Safety Parameter FIG. 3 is a flowchart illustrating an example of a process of narrowing the setting range according to the safety parameter. The flowchart of FIG. 3 is executed after the safety parameter is determined.

First, the range setting part 123 determines whether or not the determined safety parameter is 0.8, which is the determination threshold value, or more (step S1). If the safety parameter is 0.8 or more (YES in step S1), the range setting part 123 does not narrow the setting range (step S2).

If the safety parameter is less than 0.8 (NO in step S1), the range setting part 123 determines whether the safety parameter is 0.6 or more (step S3). If the safety parameter is 0.6 or more (YES in step S3), the range setting part 123 restricts the setting range of the target speed to a maximum speed of 30 km/h (step S4). Specifically, the range setting part 123 sets a restriction range [maximum speed 30 km/h] associated with a parameter range [0.6 to less than 0.8] including the safety parameter, as the setting range (see FIG. 2).

If the safety parameter is less than 0.6 (NO in step S3), the range setting part 123 determines whether the safety parameter is 0.4 or more (step S5). If the safety parameter is 0.4 or more (YES in step S5), the range setting part 123 restricts the setting range of the target speed to a maximum speed of 20 km/h and restricts the setting range of the target steering angle to a maximum steering angle of 20 degrees (step S6).

If the safety parameter is less than 0.4 (NO in step S5), the range setting part 123 determines whether the safety parameter is 0.2 or more (step S7). If the safety parameter is 0.2 or more (YES in step S7), the range setting part 123 restricts the setting range of the target speed to a maximum speed of 10 km/h and restricts the setting range of the target steering angle to a maximum steering angle of 10 degrees (step S8). If the safety parameter is less than 0.2 (NO in step S7), the range setting part 123 notifies the autonomous driving device 6 of an instruction to stop the autonomous driving vehicle M (step S9).

Figure 4:
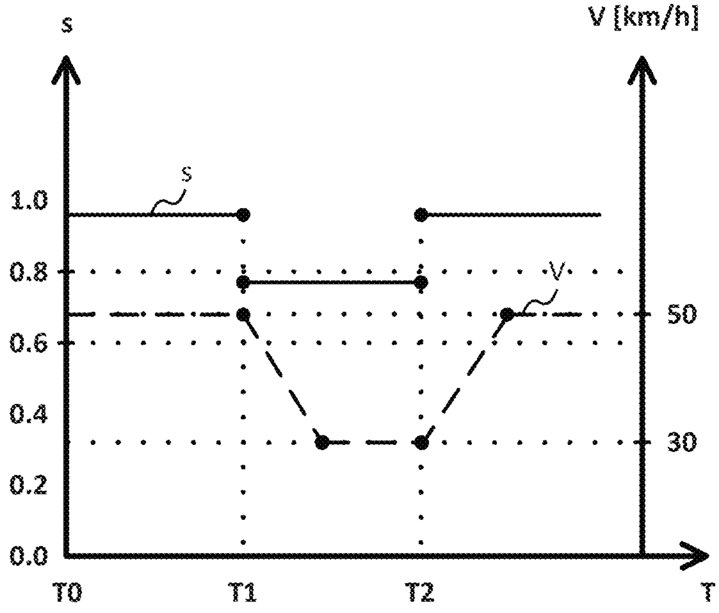
FIG. 4 illustrates an effect of a range setting apparatus.

FIG. 4 illustrates an effect of the range setting apparatus 1. In FIG. 4, the horizontal axis indicates a time T, the first vertical axis on the left indicates a safety parameter s, and the second vertical axis on the right indicates a speed per hour V of the autonomous driving vehicle M.

From a time T0 to a time T1, the autonomous driving device 6 drives the autonomous driving vehicle M at a speed of 50 km/h. The time T1 is a time at which the safety parameter s becomes less than 0.8. At the time T1, the range setting apparatus 1 sets the restriction range [maximum speed 30 km/h] associated with the parameter range [0.6 to less than 0.8] to be the set range (see FIG. 2). Then, the autonomous driving device 6 sets the target speed of the autonomous driving vehicle M to 30 km/h, and decelerates the autonomous driving vehicle M so that the speed becomes the set target speed of 30 km/h.

The time T2 is a time when the safety parameter becomes 0.8 or more. At the time T2, the range setting apparatus 1 widens the setting range that has been narrowed in accordance with the safety parameter. In other words, when the safety parameter becomes 0.8 or more, the range setting apparatus 1 removes the restriction on the setting range. The autonomous driving device 6 sets the target speed to 50 km/h, for example, and accelerates the autonomous driving vehicle M so that the speed becomes the set target speed. In this manner, the range setting apparatus 1 can appropriately limit the target values of the speed control and the steering angle control according to the condition of the autonomous driving vehicle M, the condition of the mounted device, and the condition of the surrounding environment. As a result, the autonomous driving device 6 can prevent the autonomous driving vehicle M that does not necessitate a halt from stopping, thereby preventing the autonomous driving vehicle M from obstructing the driving of other vehicles.

(Modification 1)

It should be noted that if a plurality of malfunctions occur in the autonomous driving vehicle M such that the degree of threat t becomes 1 or more, the range setting part 123 notifies the autonomous driving device 6 of the instruction to stop the autonomous driving vehicle M without determining the restriction range. In this manner, the range setting apparatus 1 can stop the autonomous driving vehicle M in a situation where the safety of the moving autonomous driving vehicle M is compromised, and thus the safety of the autonomous driving vehicle M can be improved.

(Modification 2)

Figure 5:
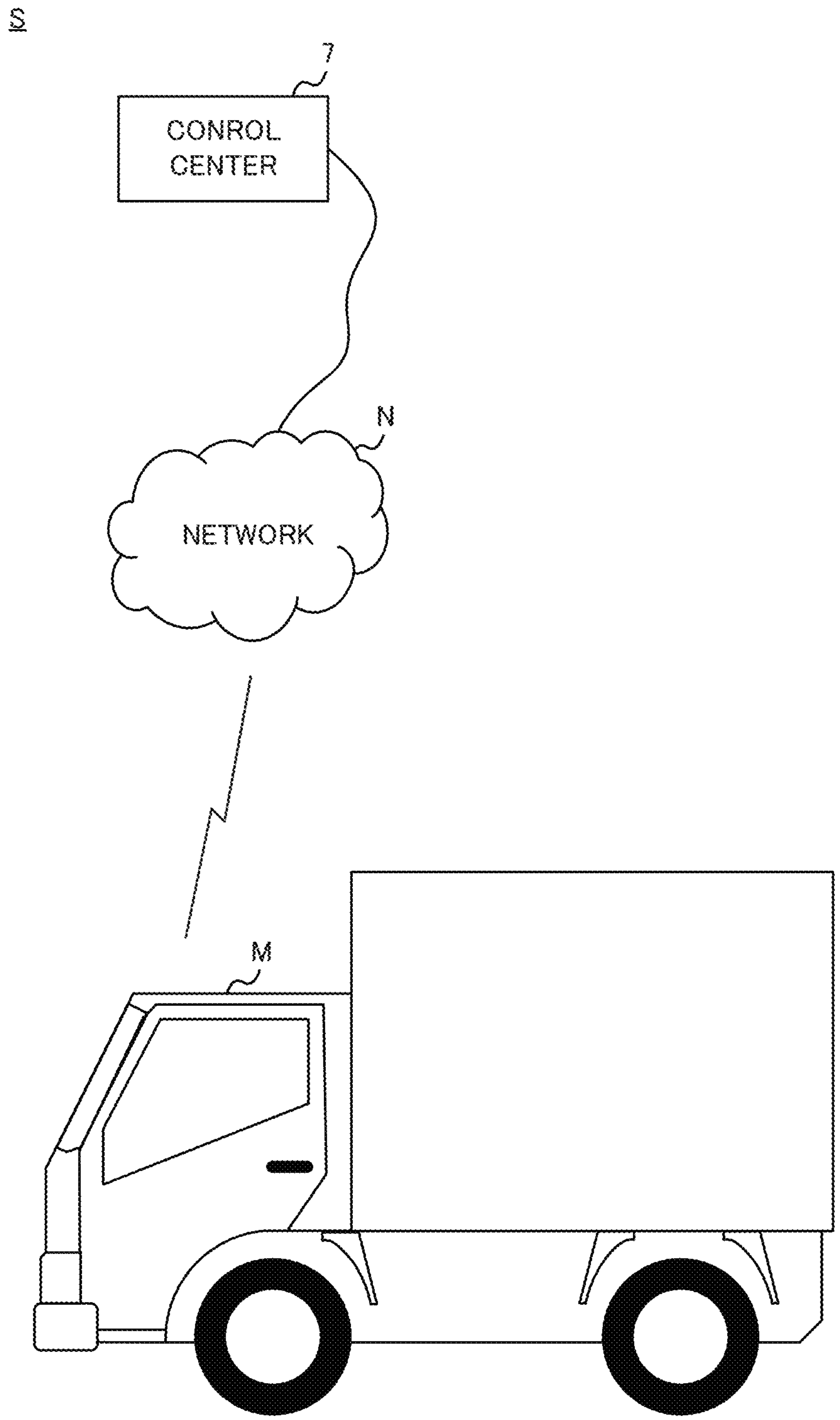
FIG. 5 is a schematic diagram of a control system.

On a road on which the autonomous driving vehicle M is driving, the upper limit of the driving speed sometimes can be regulated according to the road condition or the weather. In this case, the information acquisition part 121 acquires speed regulation information indicating an upper limit of the driving speed on the road on which the autonomous driving vehicle M is driving via the communication device 5. FIG. 5 is a schematic diagram of a control system S. A control center 7 controls the autonomous driving vehicle M and other vehicles, and transmits speed regulation information indicating an upper limit of the driving speed on the road on which the autonomous driving vehicle M is driving to the autonomous driving vehicle M via the network N, for example. The network N is the Internet, for example. The range setting part 123 sets a speed restriction range equal to or below the upper limit of the driving speed indicated by the speed regulation information acquired by the information acquisition part 121. Further, the control center 7 may transmit the weather condition information indicating the condition of weather within a predetermined area including the position of the autonomous driving vehicle M, to the autonomous driving vehicle M, for example. The information acquisition part 121 acquires the environmental condition information from the control center 7 that manages the autonomous driving vehicle M. The determination part 122 determines the weather safety degree indicating the degree of safety according to the weather condition indicated by the weather condition information acquired from the control center 7 by the information acquisition part 121.

Effect of Range Setting Apparatus 1

As described above, the range setting apparatus 1 determines at least any safety parameter among i) the first safety parameter sp1 indicating the degree of safety of the autonomous driving vehicle M while driving on the basis of the condition of the autonomous driving vehicle M and the condition of the device mounted on the autonomous driving vehicle M and ii) the second safety parameter sp2 indicating the degree of safety on the basis of the condition of the surrounding environment of the autonomous driving vehicle M and the condition of the device. If the safety parameter is below the determination threshold value, the range setting apparatus 1 narrows the setting range in which at least one of the target value of the speed control and the target value of the steering angle control can be set, according to the safety parameter.

In this manner, the range setting apparatus 1 can appropriately limit the target values of the speed control and the steering angle control according to i) at least any of the condition of the autonomous driving vehicle M and the condition of the surrounding environment, and ii) the condition of the mounted device. As a result, the autonomous driving device 6 can drive the autonomous driving vehicle M at a speed and a steering angle within ranges that do not compromise the safety, without stopping the autonomous driving vehicle M. Therefore, the autonomous driving device 6 can prevent the autonomous driving vehicle M that does not necessitate a halt from stopping, thereby preventing the autonomous driving vehicle M from obstructing the driving of other vehicles.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS

1: range setting apparatus
11: storage
12: controller
121: information acquisition part
122: determination part
123: range setting part
2: various sensors
3: various ECUs
4 GPS receiver
5: communication device
6: autonomous driving device
M: autonomous driving vehicle

The invention claimed is:

1. An autonomous driving vehicle, comprising:

one or more Electronic Control Units (ECUs) that output vehicle condition information indicating a condition of the autonomous driving vehicle;

one or more sensors that detect environmental condition information indicating condition of a surrounding environment of the autonomous driving vehicle, and ii) device condition information indicating condition of a device mounted on the autonomous driving vehicle;

a range setting apparatus including:

a determination part that determines at least any parameter among i) a first safety parameter indicating a degree of safety of the autonomous driving vehicle while driving based on the vehicle condition information and the device condition information and ii) a second safety parameter indicating the degree of safety based on the environmental condition information and the device condition information, and a range setting part that sets, as a setting range, a restriction range of a target value associated with a parameter range including a parameter, if the parameter determined by the determination part is below a determination threshold value for determining whether to restrict a setting range in which at least one of a target value for a speed control and a target value for a steering angle control of the autonomous driving vehicle can be set; and an autonomous driving device that drives the autonomous driving vehicle so that a target vehicle speed and a target steering angle are within the set setting range.

2. The autonomous driving vehicle according to claim 1, wherein the range setting part sets, as the setting range, a restriction range corresponding to a parameter range, including a value of the parameter determined by the determination part, from among a plurality of the restriction ranges, each of which is narrower than the setting range and is associated with a respective one of a plurality of the parameter ranges indicating ranges of values that the parameter can take.

3. The autonomous driving vehicle according to claim 1, wherein the determination part determines the first safety parameter and the second safety parameter, and the range setting part sets a new setting range to be whichever range is narrower among i) a range narrowed from the setting range in accordance with the first safety parameter and ii) a range narrowed from the setting range in accordance with the second safety parameter.

4. The autonomous driving vehicle according to claim 1, wherein the determination part determines the first safety parameter and the second safety parameter, and the range setting part narrows the setting range according to a lower one of the first safety parameter and the second safety parameter.

5. The autonomous driving vehicle according to claim 1, wherein the sensor detects i) the device condition information including detection accuracy degradation information indicating a degree of degradation of detection accuracy of the device that detects a surrounding environment of the autonomous driving vehicle and ii) the vehicle condition information including malfunction state information indicating a malfunction that has occurred in the autonomous driving vehicle, and the determination part determines the first safety parameter on the basis of i) the degree of degradation of detection accuracy indicated by the detection accuracy degradation information and ii) a degree of threat due to the malfunction indicated by the malfunction state information.

6. The autonomous driving vehicle according to claim 5, wherein the determination part determines, as a degree of threat due to the malfunction, a value obtained by multiplying i) a value indicating occurrence of the malfunction indicated by the vehicle condition information by ii) a value indicating magnitude of an impact of the malfunction on safety while driving.

7. The autonomous driving vehicle according to claim 5, wherein the determination part determines, as the first safety parameter, a value obtained by subtracting a higher one of the degree of threat and the degree of detection accuracy degradation, from a maximum value of the degree of safety.

8. The autonomous driving vehicle according to claim 5, wherein the determination part determines, as the first safety parameter, whichever value is lower among i) a value obtained by subtracting the degree of threat from a maximum value of the degree of safety and ii) a value obtained by subtracting the degree of degradation of detection accuracy from the maximum value.

9. The autonomous driving vehicle according to claim 8, wherein the determination part determines, as the second safety parameter, a sum of values obtained by multiplying each of a plurality of the degrees of safety by a weight of each of the degrees of safety.

10. The autonomous driving vehicle according to claim 1, wherein the sensor detects:

the environmental condition information including i) ground condition information indicating a condition of ground on which the autonomous driving vehicle is driving and ii) weather condition information indicating a condition of weather around the autonomous driving vehicle, detected by the device that detects a surrounding environment of the autonomous driving vehicle, and the device condition information including i) communication quality information indicating communication quality of a communication device mounted on the autonomous driving vehicle and ii) position detection accuracy information indicating position detection accuracy of a position detection device that detects a position of the autonomous driving vehicle, wherein the determination part determines the second safety parameter according to the condition of ground, the condition of weather, the communication quality, and the position detection accuracy.

11. The autonomous driving vehicle according to claim 10, wherein the determination part determines, as the second safety parameter, a sum of i) a ground safety degree indicating a degree of safety according to the ground condition indicated by the ground condition information, ii) a weather safety degree indicating a degree of safety according to the weather condition indicated by the weather condition information, iii) a communication safety degree indicating a degree of safety according to the communication quality indicated by the communication quality information, and iv) a position safety degree indicating a degree of safety according to the position detection accuracy indicated by the position detection accuracy information.

* * * * *